(12) United States Patent
Arndt et al.

(10) Patent No.: US 11,611,452 B2
(45) Date of Patent: Mar. 21, 2023

(54) GATEWAY FOR DATA COMMUNICATION IN A VEHICLE

(71) Applicant: Continental Automotive GmbH, Hannover (DE)

(72) Inventors: Christoph Arndt, Schwalbach a. Ts. (DE); Stefan Brunner, Schwalbach a. Ts. (DE); Helge Zinner, Schwalbach a. Ts. (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/052,961

(22) PCT Filed: Apr. 18, 2019

(86) PCT No.: PCT/EP2019/060127
§ 371 (c)(1),
(2) Date: Nov. 4, 2020

(87) PCT Pub. No.: WO2019/211103
PCT Pub. Date: Nov. 7, 2019

(65) Prior Publication Data
US 2021/0243047 A1   Aug. 5, 2021

(30) Foreign Application Priority Data
May 4, 2018  (DE) .................... 10 2018 206 934.4

(51) Int. Cl.
*H04L 12/40*  (2006.01)
*H04L 47/28*  (2022.01)
*H04L 69/08*  (2022.01)

(52) U.S. Cl.
CPC ........ *H04L 12/40032* (2013.01); *H04L 47/28* (2013.01); *H04L 69/08* (2013.01); *H04L 2012/40273* (2013.01)

(58) Field of Classification Search
CPC ..... H04L 67/2823; H04L 69/18; H04L 69/08; H04L 47/28; H04L 67/12;
(Continued)

(56) References Cited

U.S. PATENT DOCUMENTS 7,406,088 B2    7/2008  Magd et al.
10,688,874 B2 *  6/2020  Kwasnick ............... H02J 50/10
(Continued)

FOREIGN PATENT DOCUMENTS

CN    101895549    11/2010
CN    103490993    1/2014
(Continued)

OTHER PUBLICATIONS

International Search Report issued in corresponding PCT Application PCT/EP2019/060127.
(Continued)

*Primary Examiner* — Oussama Roudani
(74) *Attorney, Agent, or Firm* — Cozen O'Connor

(57) ABSTRACT

A gateway for data communication in a vehicle includes: a first communication interface, configured to use a first communication protocol; and a second communication interface configured to use a second communication protocol. The gateway is configured to transmit data from the first to the second communication interface and to transmit data from the second communication interface to the first communication interface. The gateway further includes a media converter configured to convert quality of service information from the first to the second communication protocol and from the second to the first communication protocol.

9 Claims, 12 Drawing Sheets

(58) Field of Classification Search
CPC ..... H04L 12/40032; H04L 2012/40273; H04L 45/52; H04L 12/66; G06F 13/4282; G06F 13/387; G06F 2213/3852
See application file for complete search history.

(56) References Cited

U.S. PATENT DOCUMENTS

| | | | |
|---|---|---|---|
| 2008/0288704 | A1 | 11/2008 | Diab et al. |
| 2011/0029703 | A1* | 2/2011 | Huo .................... G06F 13/4068 710/110 |
| 2011/0299410 | A1 | 12/2011 | Diab et al. |
| 2016/0085479 | A1* | 3/2016 | Edmiston .............. G06F 3/0683 711/154 |
| 2016/0191973 | A1 | 6/2016 | Joy et al. |
| 2016/0370835 | A1 | 12/2016 | Erickson et al. |
| 2017/0072876 | A1 | 3/2017 | Rajan et al. |
| 2017/0078400 | A1 | 3/2017 | Binder et al. |
| 2017/0155586 | A1* | 6/2017 | Shu ......................... H04L 12/66 |
| 2017/0180397 | A1 | 6/2017 | Appleton |
| 2017/0200324 | A1* | 7/2017 | Chennakeshu ... H04L 12/40104 |
| 2018/0121373 | A1* | 5/2018 | Qiu .......................... G06F 13/20 |
| 2019/0064910 | A1* | 2/2019 | Wang ..................... G06F 1/3206 |
| 2019/0086892 | A1* | 3/2019 | Petzen, III ......... G05B 19/4185 |
| 2019/0132424 | A1* | 5/2019 | Jeong ..................... H04L 69/08 |
| 2020/0084738 | A1* | 3/2020 | Nguyen ............. H04W 64/003 |

FOREIGN PATENT DOCUMENTS

| | | |
|---|---|---|
| CN | 203871591 U | 10/2014 |
| CN | 104272664 | 1/2015 |
| CN | 107483134 A * | 12/2017 |
| CN | 207184521 U | 4/2018 |
| EP | 2 665 227 | 9/2014 |
| KR | 2008 0013583 | 2/2008 |
| WO | WO 2014/186179 | 11/2014 |
| WO | WO 2015/198087 | 12/2015 |

OTHER PUBLICATIONS

Written Opinion issued in corresponding PCT Application PCT/EP2019/060127.
Office Action issued in corresponding German Application No. 10 2018 206 934.4.
N.N. Universal Serial Bus Specification Revision 2.0 / Apr. 27, 2000.
Office Action dated Mar. 17, 2022 issued in Chinese Patent Application No. 201980030044.X.
Office Action dated Aug. 23, 2022 issued in Chinese Patent Application No. 201980030044.X.

* cited by examiner

GATEWAY FOR DATA COMMUNICATION IN A VEHICLE

CROSS REFERENCE TO RELATED APPLICATIONS

This is a U.S. national stage of International application No. PCT/EP2019/060127, filed on Apr. 18, 2019, which claims priority to German Application No. 10 2018 206 934.4, filed May 4, 2018 the content of each of which is incorporated herein by reference.

BACKGROUND OF THE INVENTION

1. Field of the Invention

The invention relates to a gateway that transmits data from a communication interface that uses a first communication protocol to a communication interface that uses a second communication protocol.

2. Description of the Prior Art

Various standards and protocols are used today for data communication in vehicles. For example, data recorded by sensors are sent via the Controller Area Network (CAN) bus, multimedia data via a Media Oriented Systems Transport (MOST) bus, Local Internet Connect (LIN) bus for communication between actuators and sensors and FlexRay for the data interchange in safety-critical applications. In the meantime, however, the Ethernet standard is also becoming increasingly important in the onboard electrical systems of automobiles. With increasing demands on the electrification of vehicles and the associated replacement of mechanics, the requirements for electrical systems with regard to determinism and quality are increasing. Communication systems have to meet the growing demands for security, reliability and comfort even more than ever.

Particularly in view of the increasing use of the Ethernet and Internet Protocol (IP) protocols, connection to the outside world is becoming more and more important. Data is transmitted from the vehicle to data centers, other vehicles and receiving units along the road or remotely, and conversely data are sent to the vehicle from data centers, service providers, transmitting units along the road or other vehicles. However, software updates after delivery or when necessary, e.g., for security updates, should be also carried out immediately if possible, and it is advisable for this to be done either by the customer himself or via radio systems.

Inside vehicles, sensors such as, e.g., cameras, collision avoidance systems, comfort and infotainment generate data that is communicated internally and externally.

A standard for an interface to the outside world and for applications in the vehicle is the Universal Serial Bus standard (USB). Typical communication chips only have the USB bus system—which is sufficiently fast but not adequate with regard to future networking requirements. However, USB has only limited suitability as a bus system in the vehicle.

SUMMARY OF THE INVENTION

It is an object of the invention to improve the networking of vehicles. The object is achieved by a gateway, a vehicle that has such a gateway, and a method, and a computer-readable medium.

According to one exemplary aspect, a gateway for data communication in a vehicle is provided, having a first communication interface, which uses a first communication protocol, and a second communication interface, which uses a second communication protocol, the gateway being configured to transmit data from the first to the second communication interface and to transmit data from the second communication interface to the first communication interface, and wherein the gateway comprises a media converter for converting quality of service information from the first to the second communication protocol and from the second to the first communication protocol.

The converter is, for example, a media converter that transmits the quality of service in both directions. Information regarding the priority of transmitted packets, that is to say the quality of service, is thus retained. The quality of service can be read from the respective standard and translated into a corresponding quality of service of the respective other standard in accordance with a rule.

This advantageously allows a transition to be created between USB and a technology that can transmit the high data rate of USB and that can offer additional functions in order to be capable of future functions and software downloads.

According to one exemplary embodiment, the gateway furthermore comprises a time synchronization circuit (105, 106), configured to convert a time synchronization from the first communication protocol to the second communication protocol.

Most of the field buses in the vehicle operate in a time-controlled fashion. The synchronization gateway allows the transmission of time information, and also synchronized processes and control mechanisms, especially with regard to automated driving. A synchronized time base is an important basis for predictable communication. The need to create cross-bus time synchronization between USB and Ethernet is increasing due to requirements for Car2X & software downloads, that is to say including automated driving and synchronization with for example GPS, Galileo and Glonass.

According to one exemplary aspect, the time synchronization circuit is configured to synchronize a transmission clock of the first communication protocol with a transmission clock of the second communication protocol. This also allows the data frames that, according to the respective transmission protocol, comprise multiple data packets to be synchronized.

According to one exemplary aspect, the first communication protocol contains a temporal association of data by time stamps and the gateway is configured to assign the time stamps to the converted data when converting the data from the first communication protocol to the second communication protocol. The time stamps, which are an absolute time associated with the data frames, are thus retained.

According to one exemplary aspect, the interface is configured to combine data into data packets and the second interface is configured to receive the data packets and to tunnel to a further interface of the first communication standard, and wherein the gateway is configured to measure the transfer time of the data. The transfer time measurement is required when packets are tunneled through the system, because, e.g., the realtime requirements need to be checked and adhered to. The transfer time can also be evaluated and processed by the applications, such as, for example, applications in which measurements are included in functions that are dependent on time or applications that require synchronization.

According to one exemplary aspect, the communication protocol of the first communication interface is USB and the communication protocol of the second communication interface is an Ethernet standard for vehicle technology.

The Ethernet standard for vehicle technology differs from the Ethernet standard in information technology due to special requirements in the vehicle on the physical level. An Ethernet standard on the physical level is, for example, BroadR-Reach technology, in which multiple vehicle onboard systems can access information simultaneously via unshielded twisted pair cables. With BroadR-Reach, applications such as, e.g., 360-degree all-round parking assistance, reversing cameras, collision avoidance systems, comfort and infotainment solutions, etc., can be integrated into an open and scalable Ethernet network using twisted pair cables. 100Base-T1 is an Ethernet interface for a data rate of 100 Mbit/s that is based on BroadR-Reach. The data communication takes place via a simple, unshielded wire pair (unshielded twisted pair, UTP) in full duplex. At Media Access Control (MAC) level, however, the Ethernet frame format is retained.

Another example with USB are antenna modules that contain communication chips (Network Access Devices, called NADs), which typically have USB as fast communication interfaces, but which do not have a network interface. These can be connected to the network through the gateway according to the invention, e.g., in order to load software updates into the vehicle's Ethernet backbone.

Both the USB standard and the Ethernet standard offer the properties of time information in the form of time stamps and a time structure that can be synchronized and transmitted to one another and also quality of service information that can be mapped to one another. The clock can be set to the time synchronization of Ethernet and kept in sync.

According to one exemplary embodiment, the gateway further has:
a power supply analysis circuit, configured to analyze the supply voltage to be provided by the gateway for the USB components connected to the gateway. The power supply analysis circuit makes it possible to distinguish whether the system is intended to act as a USB host and therefore provides the power for connected components, or whether the system is connected to another host. The power supply analysis circuit can also ascertain the current and voltage values for the connected USB devices, e.g., by the USB configuration and information transmitted from the Ethernet, and provide the power.

According to one exemplary aspect, components that are in a power-saving mode can be connected to the gateway, and the gateway further has a subnetwork control unit for activating components that are in the power-saving mode. It is thus possible to operate the system comprising the gateway and the connected devices with partial networking, i.e., the system or parts of it can be put into a power-saving mode and woken up when they are needed again. The functionality of the wake-up call also exists for connected devices, i.e., the system can wake up connected components from the power-saving mode.

According to one exemplary aspect, a vehicle is provided that has a gateway as described above.

According to another exemplary aspect, a method for data communication in a vehicle is provided, having the steps of:
receiving data at a first communication interface, which uses a first communication protocol,
converting quality of service information from the first to a second communication protocol,
transmitting the data to a second communication interface, which uses the second communication protocol.

According to one exemplary aspect, a program element is also provided that, when executed on a processor of a gateway, instructs the gateway to carry out the steps described above and below.

According to another exemplary aspect, a computer-readable medium is also provided on which such a program element is stored.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described below with reference to the figures, in which.

DETAILED DESCRIPTION OF THE PRESENTLY PREFERRED EMBODIMENTS

Various standards and protocols are used for data communication in vehicles. For example, data recorded by sensors are sent via the CAN bus, and multimedia data via a MOST bus. In the meantime, however, the Ethernet standard is also becoming increasingly important in the onboard electrical systems of automobiles.

The supply voltage is transmitted via the UTP cable according to the IEEE-802.3bu standard "Power over Data Lines (PoDL)". This method involves motor vehicle components being supplied with supply voltage via data lines with minimal interference between the data and the supply voltage. In order to use this, end devices or applications must be compatible with PoDL, so that a special device, the power sourcing equipment in the network, can ascertain the devices that require power. These are then called powered devices (PD).

A technical challenge of the electrical-electronic (EE)/architectures in the coming years will be the increasing communication interfaces such as LTE, 5G and the resulting data rates that will also be found in the car, among other things, via the connectivity unit, an adapted piece of hardware that establishes the connection between the control units in the vehicle and a data center, an antenna module for establishing network access with a network access device (NAD) or else a connectivity gateway.

Figure 1:
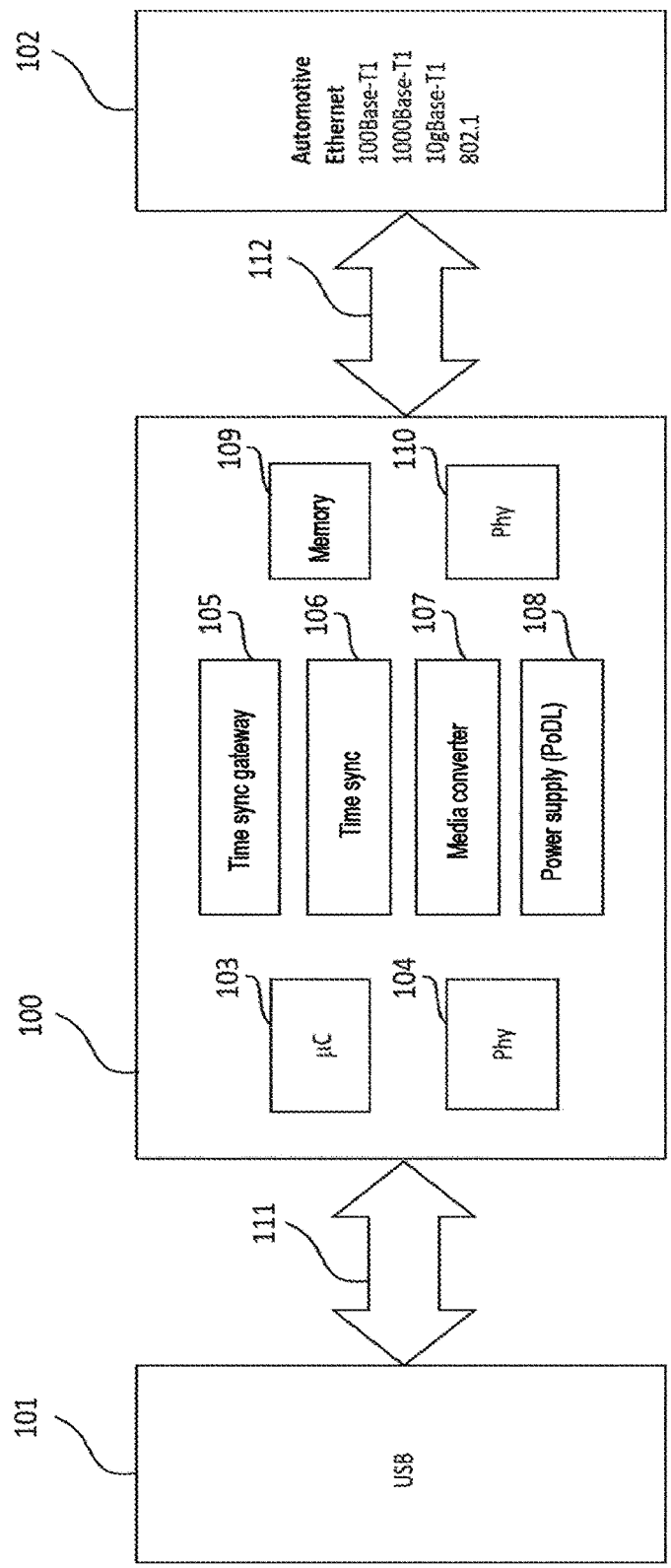
FIG. 1 shows an arrangement according to an exemplary embodiment.

FIG. 1 shows an arrangement according to an exemplary embodiment with a gateway 100 for data communication in a vehicle, an interface 111 to a first communication standard 101 and an interface 112 to a second communication standard 102. The first communication standard is, e.g., the USB standard and the second communication standard is a standard that has been specifically created for vehicle technology, such as, e.g., the Ethernet standard BroadR-Reach with a physical level according to 100Base-T1. Other protocols besides BroadR-Reach (100Base-T1) of the IEEE 802.3bw working group are, e.g., 1000Base-T1 of the IEEE 802.3 bp working group, and efforts are already being made to standardize even higher speeds for automotive Ethernet. Automotive Ethernet is therefore ideally suited for the transmission of large volumes of data such as for example uncompressed sensor data and flash data, that is to say data that are written to the flash memory of control units.

The Media Access Control (MAC) level or the network access may be specified, e.g., in accordance with IEEE802.1. In particular, the IEEE802.1P standard specifies the quality of service classes and the IEEE802.1Q what is known as the "Virtual Local Area Network (VLAN) tagging", in which the quality of service is inserted into the Ethernet data frame.

The microcontroller 103 in FIG. 1 controls the processes within the gateway. The modules 104 and 105 form the physical interfaces to the respective standard. The media converter 107 provides the functionality of a quality of service transmission from USB to Ethernet and vice versa. The quality of service in the case of Ethernet can be determined by the 802.1Q priority and in the case of USB by the transfer type. The quality of service information of the respective communication protocol is read from the data frames, converted and inserted into the data frames of the respective other communication protocol. The time synchronization gateway 105 transmits the realtime-critical (e.g., time synchronization) data. The quality of service information is retained. The time synchronization in the module 106 guarantees the execution of distributed processes. Cross-bus time synchronization between USB and Ethernet permits software downloads to be catered for and the requirements of the Car2X protocol to be met and thus also provides the prerequisites for automated driving and synchronization with for example GPS. This implementation ensures the temporal synchronicity of applications in the vehicle from Ethernet and USB. The power supply module 108 provides the power supply to the connected modules via the data lines. For USB it also detects the output voltage to be provided and the maximum permissible current draw of the USB device. A memory 109 is used to buffer the data.

Figure 2:
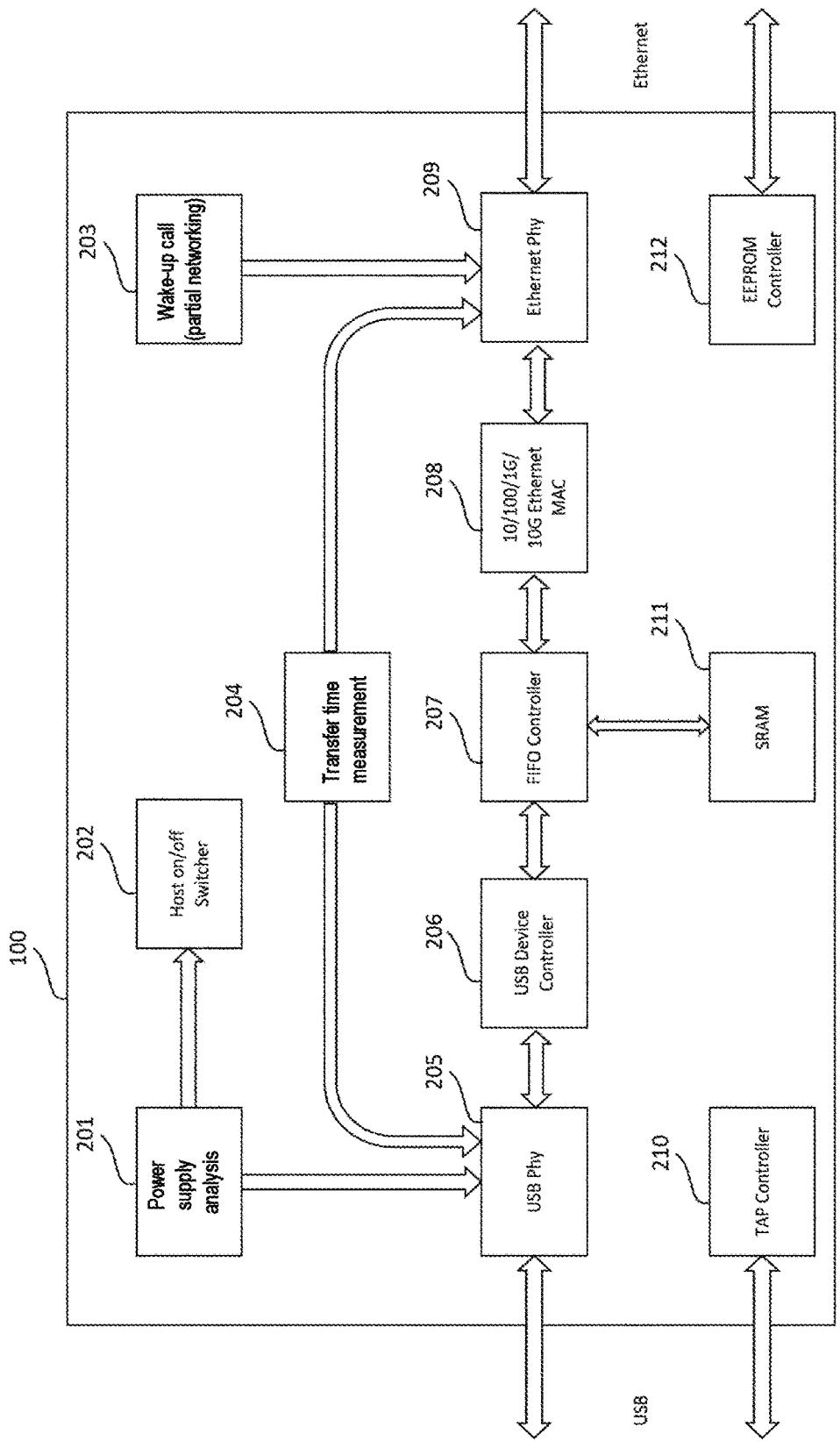
FIG. 2 shows a gateway according to an exemplary embodiment.

FIG. 2 shows a typical gateway according to an exemplary embodiment that has additional modules. A typical gateway for converting USB to Ethernet and vice versa comprises the physical interface 205, the lines of which are used to receive or send the data and which guarantees physical properties of the data. A USB device controller 206 is responsible for the USB access of the connected USB devices and uses a "first in first out" (FIFO) controller to write the data to be converted to an associated static random access (SRAM) memory 211 for buffering the data. The data are then fetched via the FIFO controller again from a 10/100/1G/10G Ethernet MAC module, which controls the access of the connected Ethernet devices. The physical Ethernet interface 209 finally ensures the physical properties of the data at the interface. The data flow from the Ethernet interface to the USB interface takes place in a corresponding manner. The gateway further comprises a test access point (TAP) controller 210, which is used for programming and testing the hardware. An EEPROM controller 212 with an external interface contains, e.g., configuration data for the hardware or firmware of the gateway 100. In addition to the typical modules, the gateway according to one exemplary embodiment contains a transfer time measurement for the transfer time of the data from the physical interface 205 to the physical interface of the Ethernet 209 or in the opposite direction. Another additional module contains the power supply analysis 201, which firstly analyzes whether a connected USB device is configured as a client or as a host and to which energy class it is assigned, so as to use the host on/off switch 202 to provide no power or an appropriate power.

Figure 3:
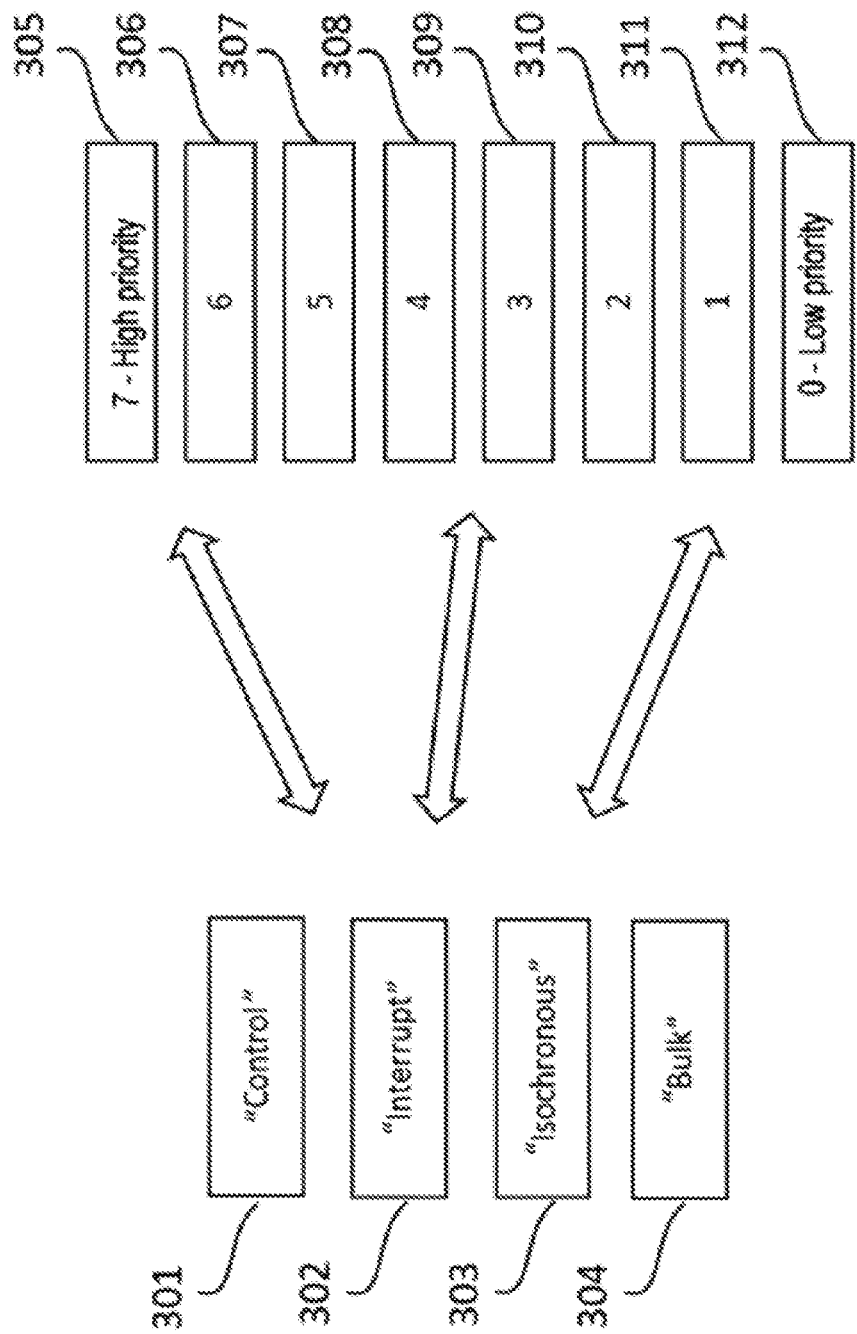
FIG. 3 shows a quality of service assignment according to an exemplary embodiment.
Figure 4:
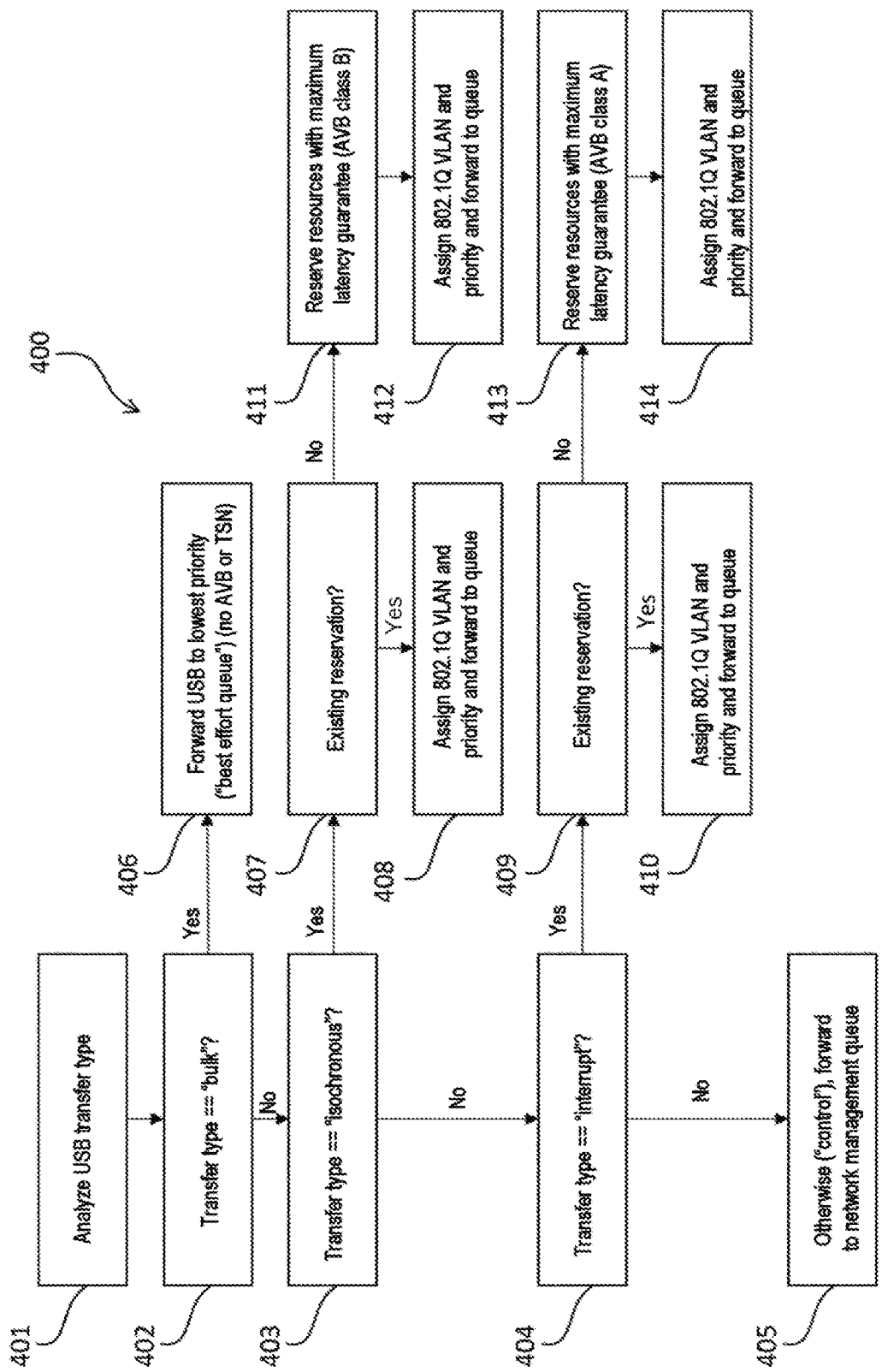
FIG. 4 shows a method for quality of service assignment according to an exemplary embodiment.

FIG. 3 shows a basic depiction of a quality of service assignment according to an exemplary embodiment, in which the IEEE802.1Q class (Audio Video Bridging/Time Sensitive Networking; AVB/TSN) and the Internet Protocol-Type of Service (IP-TOS) class is assigned to the USB transfer type. The left-hand column in FIG. 4 shows the USB transfer types control ("Control") 301, interrupt 302, isochronous ("isochronous") and mass ("bulk"). The right-hand column in FIG. 4 shows the Ethernet priorities, "7" 305 having the highest priority and being graded in steps to the lowest priority "0" 312. An algorithm therefor is presented in FIG. 4.

FIG. 4 shows a method according to an exemplary embodiment in which the USB quality of service is assigned to the Ethernet quality of service. In 401 the process for analyzing the USB transfer type is started. In 402 a check is performed to ascertain whether the type is "bulk". If so, in 406 the USB data packets are directed into the lowest priority class, what is known as the "best effort" queue (no AVB or TSN). If the type "bulk" has not been detected, a check is performed in 403 to ascertain whether the type is "isochronous". If so, a check is performed in 407 to ascertain whether a resource reservation already exists. If so, an 802.1Q VLAN priority is assigned in 408 to the data packets and forwarded to the appropriate queues. If there is no resource reservation, resources with maximum latency guarantee (AVB class B) are assigned in 411 and then in 412 an 802.1Q VLAN priority is assigned and forwarded to the appropriate queues. If the "isochronous" type is not determined in 403, the "interrupt" type is checked in 404. If the type is "interrupt", a check is performed in 409 to ascertain whether a reservation exists. If so, in 410 an 802.1Q VLAN priority is assigned to the data packets and forwarded to the appropriate queues. If not, resources with maximum latency guarantee (AVB class A) are reserved in 413 and then in 414 the data packets are assigned to an 802.1Q VLAN priority and forwarded to the appropriate queues. If it is found in 404 that the type is not "interrupt", the type is "control" and the data packets are forwarded to the network management queue in 405.

Figure 5:
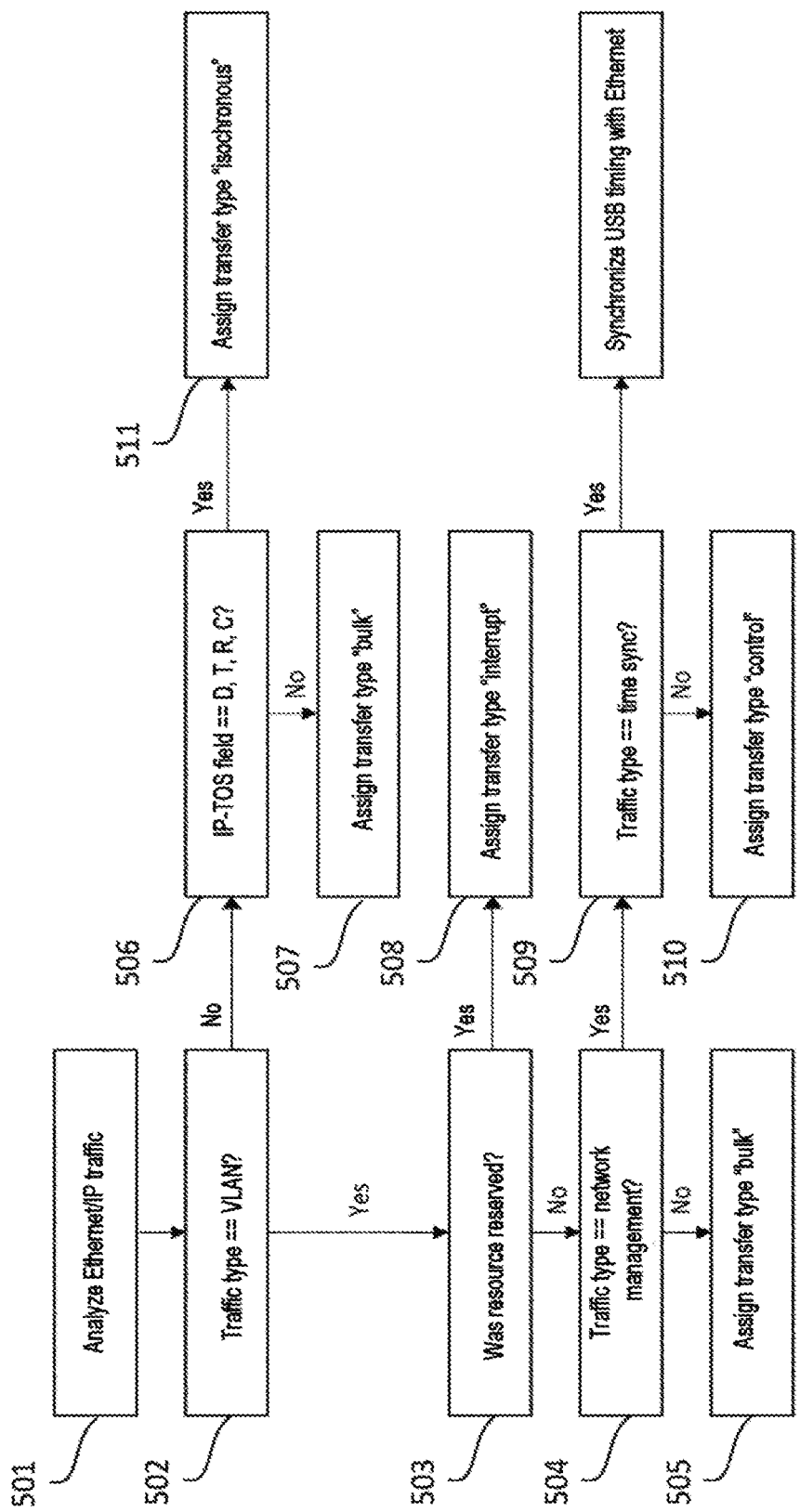
FIG. 5 shows a further method for quality of service assignment according to an exemplary embodiment.

FIG. 5 shows a method according to an exemplary embodiment in which the Ethernet quality of service is assigned to the USB quality of service, i.e., the USB transfer types. In 501 the process of analyzing the Ethernet/Internet Protocol (IP) data traffic is started. In 502 a check is performed to ascertain whether the type is VLAN. If not, a check is performed in 506 to ascertain whether the IP-TOS field in the data packets is "D", "T2", "R" or "C". If so, the transfer type "isochronous" is assigned in 511. If the result in 506 was "no", the traffic type "bulk" is assigned in 507. If it has been found in 502 that the type was VLAN, then a check is performed in 503 to ascertain whether the data stream was reserved. If so, the transfer type "interrupt" is assigned in 508. If not, a check is performed in 504 to ascertain whether the traffic is assigned to the "network management". If so, a check is performed in 509 to ascertain whether the traffic is time-synchronized. If so, the USB timing is synchronized with the Ethernet timing in 512. If it was found in 509 that the traffic is not time-synchronized, the transfer type "control" is assigned in 510. If it was found in 504 that the traffic is not assigned to the "network management", then the transfer type "bulk" is assigned in 505.

Figure 6:
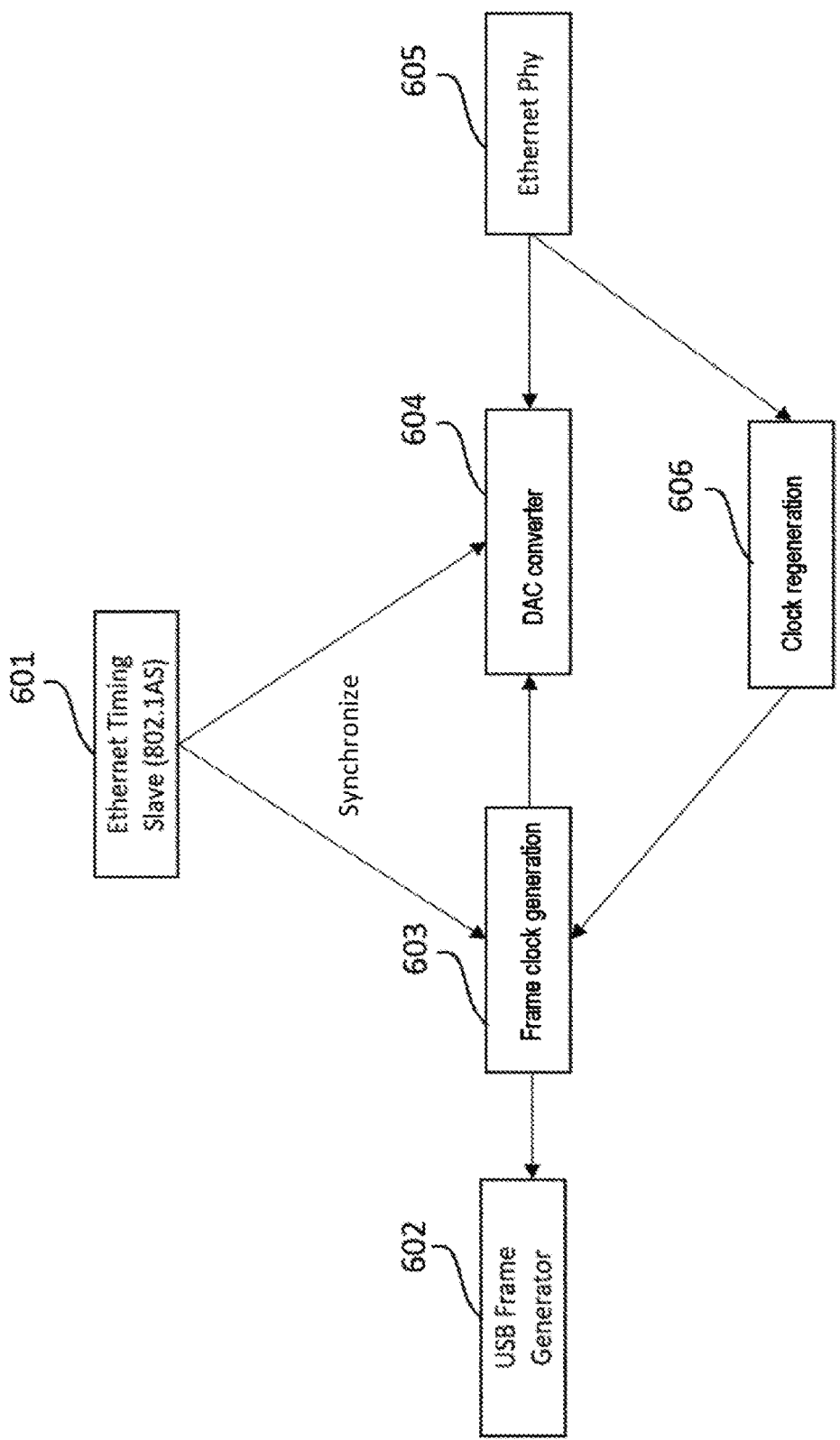
FIG. 6 shows a block diagram of the time synchronization according to an exemplary embodiment.

FIG. 6 shows a block diagram of the time synchronization in the media converter 107 according to an exemplary embodiment. The Ethernet data blocks are received at the Ethernet physical layer interface module 605. The clock of the data is regenerated in the module 606 and the data frames are forwarded to the module 603. The Ethernet timing slave (802.1 AS) 601 synchronizes, on an Ethernet clock basis, both the frame clock for the USB frames in the frame clock generation module 603 to the Ethernet clock and the digital-to-analog converter 604, which likewise receives data blocks from the Ethernet physical layer interface module 605. The USB frame generator 602 finally generates the USB data frames on the basis of the synchronized frame clock.

Figure 7:
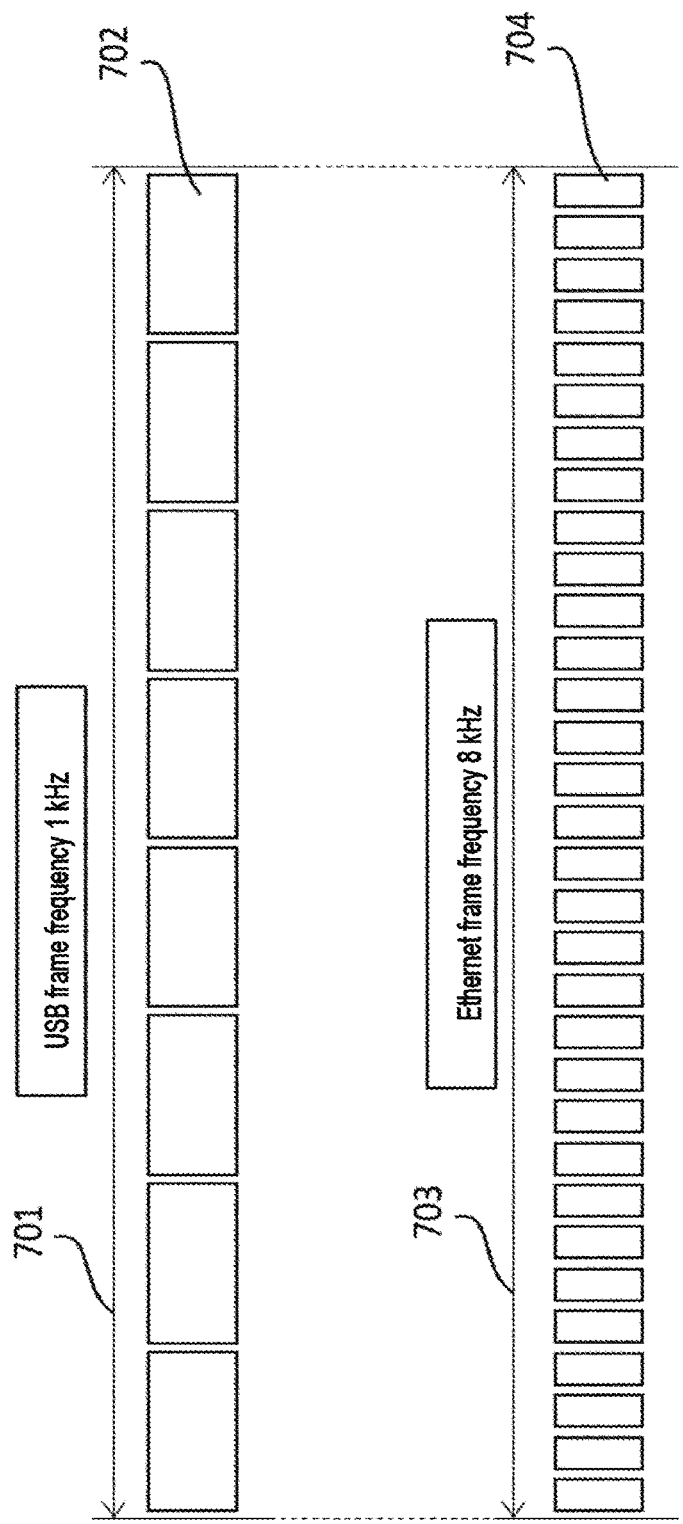
FIG. 7 shows a chart of the time synchronization according to an exemplary embodiment.

FIG. 7 shows a chart of the time synchronization according to an exemplary embodiment. A USB frame is sent at a frequency of 1 kHz. The aim of the approach presented here is to set this clock to the time synchronization of Ethernet and to keep it in sync. The USB frame frequency for the USB frame 701 with the USB data blocks 702 is 1 kHz in the example in this figure, while the Ethernet frame frequency for the Ethernet frame 703 with the Ethernet data blocks 704 is 8 kHz in the example in this figure. The Ethernet frame frequency can, e.g., also be 1 kHz or 4 kHz. The USB frame frequency is synchronized to the Ethernet frame frequency.

Figure 8:
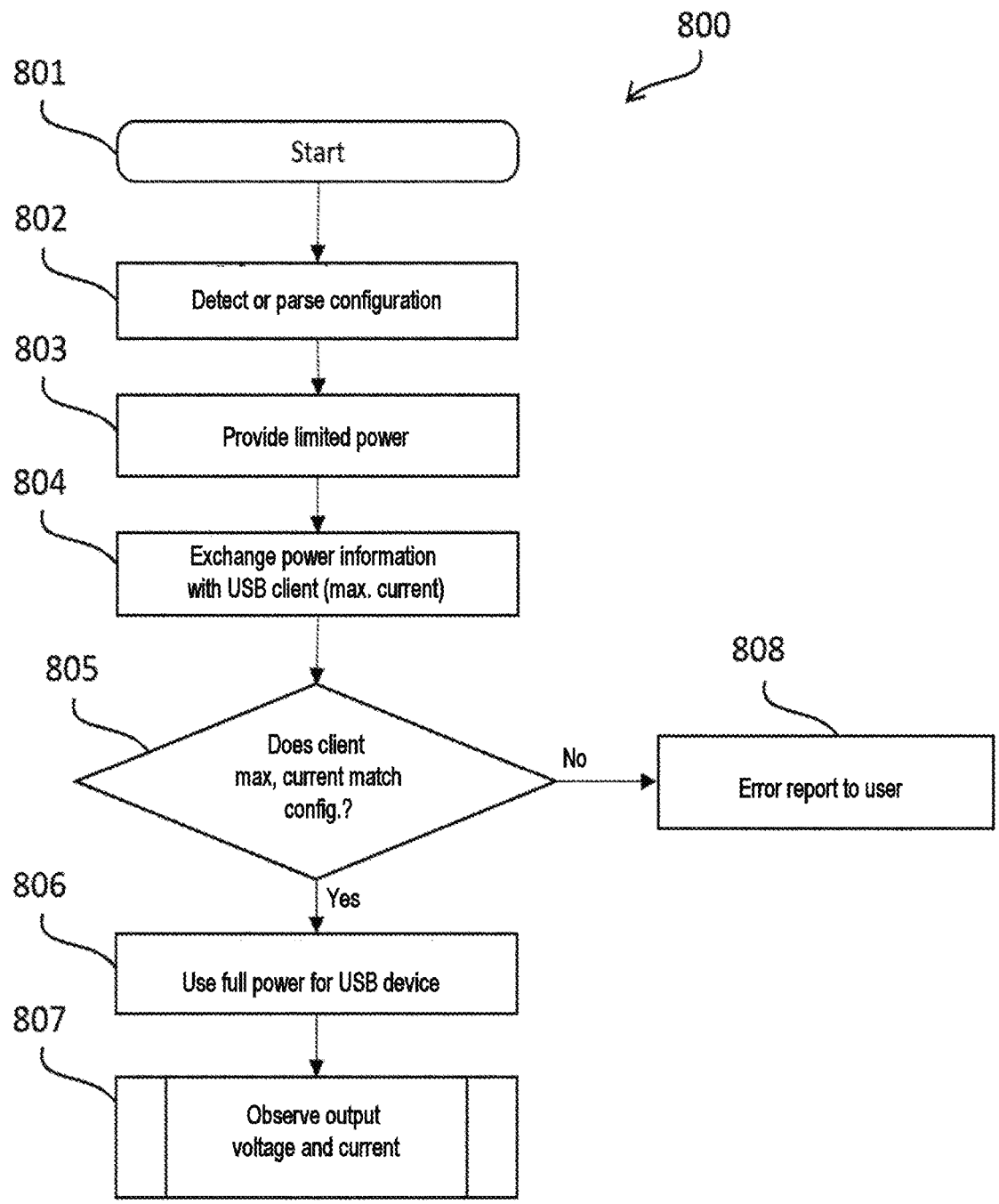
FIG. 8 shows a chart for negotiating the energy class according to an exemplary embodiment.

FIG. 8 shows the communication sequence 800 before the power supply is provided to the USB device, which is started in 801, according to an exemplary embodiment. In the first step 802 a configuration is received from an external unit in the vehicle or an already stored configuration is read in. This configuration contains information such as the input voltage, the output voltage to be provided and the maximum permissible current draw of the USB device. In the next step 803 the USB device is supplied with voltage for configuration. However, the current intensity provided therefor is not yet higher than 500 mA in order to protect the entire system from excessive energy consumption. In the next step 804 the planned current draw is negotiated with the USB device. If the current draw communicated by the USB device matches the maximum current draw permitted in the configuration, or if the current draw is below the maximum value, then in step 806 the maximum power supply provided by the system is adapted for the maximum permitted value stored in the configuration. After that, in step 807, the output voltage and the current are monitored (see FIG. 9). If in step 804 the communicated current draw does not match the maximum current draw permitted according to the configuration, an error report is sent to the user in 808.

Figure 9:
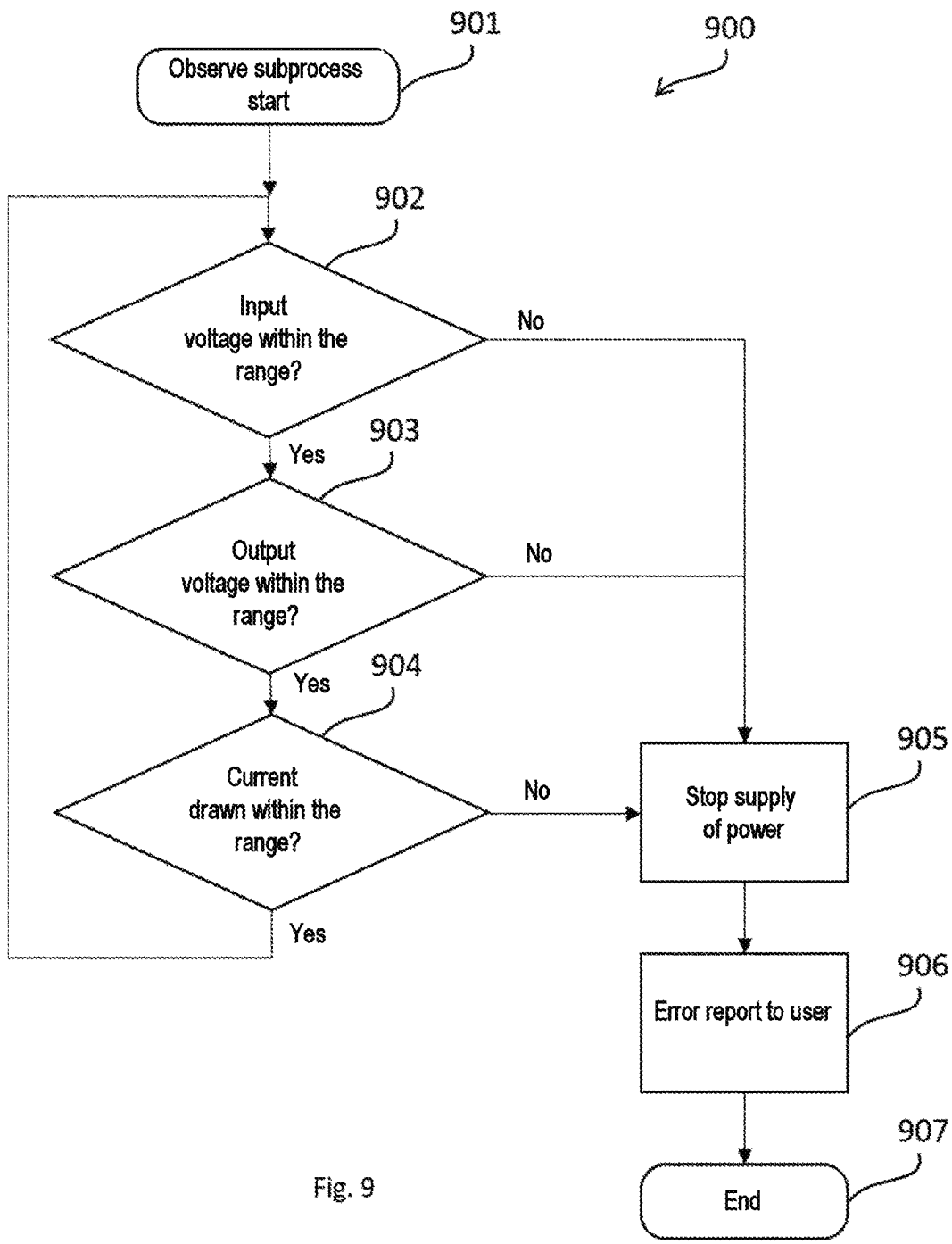
FIG. 9 shows a chart for monitoring the power supply according to an exemplary embodiment.

FIG. 9 shows the sequence 900 of monitoring the power supply according to an exemplary embodiment. In 902 the input voltage and in 903 the output voltage are monitored to determine whether they are within the permissible values. In addition, the current drawn by the USB device is monitored in 904. If the permissible limit values are exceeded, the power supply to the terminal is interrupted in 905 in order to protect it. An error report is sent to the user in 906 and the subprocess is finally ended in 907.

Figure 10:
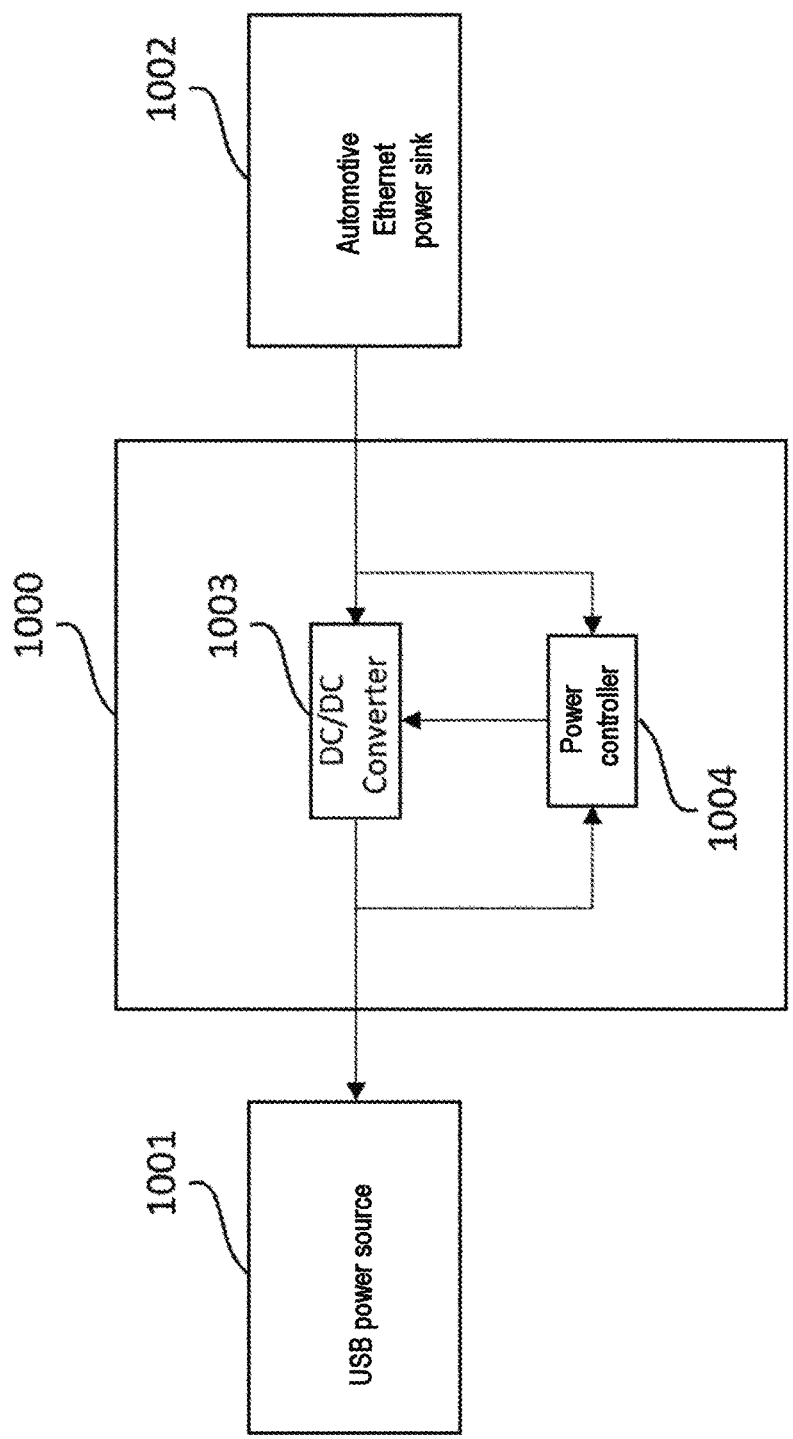
FIG. 10 shows a block diagram of the bidirectional power supply according to an exemplary embodiment.

FIG. 10 shows the logical block diagram of the power supply unit 1000 according to an exemplary embodiment. The power supply unit has a direct current/direct current, DC/DC converter that converts the voltage of the vehicle electrical system 1002, usually 12 V or 24 V, into a stabilized voltage 1001 suitable for the USB device. The supply voltage 1002 provided by the vehicle by power over data lines (PoDL) via Ethernet is monitored by a controller 1004 with reference to the voltage 1002 provided. The controller 1004 monitors the output voltage 1001 generated for USB and the current drawn by the USB. In addition, the controller 1004 is able to completely deactivate the power supply to the USB device. This can be done, for example, in response to external requirements, such as, for example, in the case of partial networking.

FIG. 10 shows a vehicle 1100 according to an exemplary embodiment that contains the gateway 100.

Figure 11:
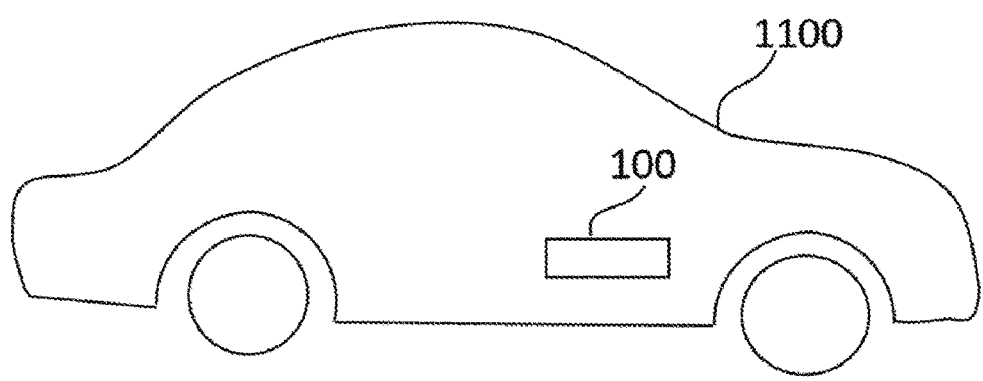
FIG. 11 shows a vehicle according to an exemplary embodiment.

FIG. 11 shows a method for data communication in a vehicle according to an exemplary embodiment that includes the steps of
receiving data at a first communication interface (111), which uses a first communication protocol, in 1101,
converting the data from one communication protocol to a second communication protocol in 1102,
providing the data at the second communication interface (112) in 1102.

Figure 12:
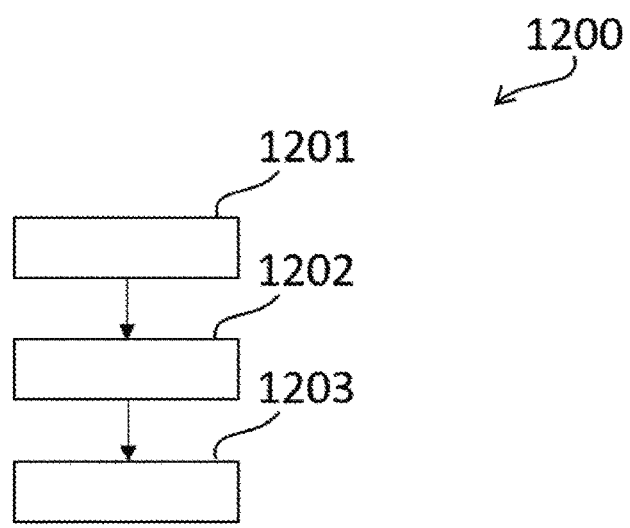
FIG. 12 shows a method according to an exemplary embodiment.

FIG. 12 is a flow chart showing a method 1200 for data communication in a vehicle. The method 1200 has the steps of: receiving, in 1201, data at a first communication interface 111, which uses a first communication protocol, converting, in 1202, quality of service information from the first to a second communication protocol, and transmitting, in 1203, the data to a second communication interface 112, which uses the second communication protocol.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A gateway (100) for data communication in a vehicle, the gateway (100) being a part of a system comprising the gateway (100) and connected components, the gateway (100) comprising:

a first communication interface, configured to use a first communication protocol;

a second communication interface configured to use a second communication protocol; and a power supply analysis circuit (108) configured to analyze the supply voltage to be provided by the gateway for USB components connected to the gateway, the power supply analysis circuit being configured to distinguish between (a) the system acting as a USB host that provides power for the connected components, and (b) the system being connected to another host, wherein the gateway (100) is configured to transmit data from the first (111) to the second (112) communication interface and to transmit data from the second communication interface (112) to the first communication interface (111), wherein the gateway (100) further comprises a media converter (107) configured to convert quality of service information from the first to the second communication protocol and from the second to the first communication protocol, wherein the first communication protocol contains a temporal association of data by time stamps and the gateway (100) is configured to assign the time stamps to the converted data when converting the data from the first communication protocol to the second communication protocol, and wherein the gateway is configured to measure the transfer time of the data to time synchronize the data.

2. The gateway (100) as claimed in claim 1, further comprising a time synchronization circuit (105, 106), configured to convert a time synchronization from the first communication protocol to the second communication protocol.

3. The gateway (100) as claimed in claim 2, wherein the time synchronization circuit (105, 106) is configured to synchronize a transmission clock of the first communication protocol with a transmission clock of the second communication protocol.

4. The gateway as claimed in claim 1, wherein the first communication interface is configured to combine data in data packets and the second communication interface is configured to receive the data packets and to tunnel to a further interface of the first communication protocol.

5. The gateway (100) as claimed in claim 1, wherein the communication protocol of the first communication interface (111) is USB and the communication protocol of the second communication interface (112) is an Ethernet standard for vehicle technology.

6. The gateway (100) as claimed in claim 1, wherein components in a power-saving mode are connected to the gateway, the gateway further comprising:

a subnetwork control unit (203) configured to activate components that are in the power-saving mode.

7. A vehicle comprising the gateway (100) as claimed in claim 1.

8. A method (1200) for data communication in a vehicle, comprising the steps of:

receiving (1201) data at a first communication interface (111), which uses a first communication protocol;

converting (1202) quality of service information from the first to a second communication protocol;

transmitting (1203) the data to a second communication interface (112), which uses the second communication protocol; and analyzing, by a power supply analysis circuit (108), the supply voltage to be provided by a gateway for USB components connected to the gateway, the power supply analysis circuit being configured to distinguish between (a) the system acting as a USB host that provides power for the connected components, and (b) the system being connected to another host, wherein the first communication protocol contains a temporal association of data by time stamps and the gateway (100) is configured to assign the time stamps to the converted data when converting the data from the first communication protocol to the second communication protocol, and wherein the gateway is configured to measure the transfer time of the data to time synchronize the data.

9. A non-transitory computer-readable medium storing a program that, when executed on a processor (103) of a gateway (100), the gateway (100) being a part of a system comprising the gateway (100) and connected components, instructs the gateway (100) to perform the following steps:

receiving (1201) data at a first communication interface (111), which uses a first communication protocol;

converting (1202) quality of service information from the first to a second communication protocol;

transmitting (1203) the data to a second communication interface (112), which uses the second communication protocol; and analyzing, by a power supply analysis circuit (108), the supply voltage to be provided by the gateway for USB components connected to the gateway, the power supply analysis circuit being configured to distinguish between (a) the system acting as a USB host that provides power for the connected components, and (b) the system being connected to another host, wherein the first communication protocol contains a temporal association of data by time stamps and the gateway (100) is configured to assign the time stamps to the converted data when converting the data from the first communication protocol to the second communication protocol to retain an absolute time associated with the data, and wherein the gateway is configured to measure the transfer time of the data in both directions to time synchronize the data.

* * * * *